(12) United States Patent
Do et al.

(10) Patent No.: US 10,475,636 B2
(45) Date of Patent: Nov. 12, 2019

(54) ELECTRODELESS LAMP SYSTEM AND METHODS OF OPERATION

(71) Applicant: NXP USA, Inc., Austin, TX (US)

(72) Inventors: Steven Do, Chandler, AZ (US); Lionel Mongin, Chandler, AZ (US); Pierre Marie Jean Piel, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 6 days.

(21) Appl. No.: 15/719,482

(22) Filed: Sep. 28, 2017

(65) Prior Publication Data

US 2019/0096656 A1    Mar. 28, 2019

(51) Int. Cl.
*H01J 65/04*        (2006.01)
*H05B 41/39*        (2006.01)
*H01J 61/95*        (2006.01)
*H01J 61/04*        (2006.01)
*H05B 41/28*        (2006.01)

(52) U.S. Cl.
CPC .......... *H01J 65/042* (2013.01); *H01J 61/04* (2013.01); *H01J 61/95* (2013.01); *H01J 65/044* (2013.01); *H01J 65/046* (2013.01); *H05B 41/2806* (2013.01); *H05B 41/39* (2013.01)

(58) Field of Classification Search
None
See application file for complete search history.

(56) References Cited

U.S. PATENT DOCUMENTS 3,993,927 A    11/1976    Haugsjaa et al.
4,001,632 A    1/1977    Haugsjaa et al.
(Continued)

FOREIGN PATENT DOCUMENTS

EP    0 313 028 B1    7/1995
GB    315369 A    * 10/1930    .............. H01J 17/40
(Continued)

OTHER PUBLICATIONS

"UV Water Purifier Comparison", The UV Application Specialist, pp. 1-6, retrieved from the Internet Aug. 29, 2017 at: https://ultraviolet.com/uv-water-purifier-comparison/ (Jun. 15, 2017).
(Continued)

*Primary Examiner* — Dion Ferguson
*Assistant Examiner* — Srinivas Sathiraju
(74) *Attorney, Agent, or Firm* — Sherry W. Schumm

(57) ABSTRACT

An embodiment of a system includes an RF signal source, a first electrode, a second electrode, and a cavity configured to receive an electrodeless bulb. The RF signal source is configured to generate an RF signal. The first electrode is configured to receive the RF signal and to convert the RF signal into electromagnetic energy that is radiated by the first electrode. The cavity is defined by first and second boundaries that are separated by a distance that is less than the wavelength of the RF signal so that the cavity is sub-resonant. The first electrode is physically positioned at the first boundary, and the second electrode is physically positioned at the second boundary. The first electrode, the second electrode, and the cavity form a structure that is configured to capacitively couple the electromagnetic energy into the electrodeless bulb when the electrodeless bulb is positioned within the cavity.

20 Claims, 7 Drawing Sheets

(56) References Cited

U.S. PATENT DOCUMENTS

| | | |
|---|---|---|
| 4,041,352 A | 8/1977 | McNeill et al. |
| 4,053,814 A | 10/1977 | Regan et al. |
| 4,431,947 A * | 2/1984 | Ferriss ............... H05B 41/3922 |
| | | 250/205 |
| 4,937,503 A | 6/1990 | Sigai et al. |
| 5,019,750 A | 5/1991 | Godyak |
| 6,162,406 A | 12/2000 | Michael |
| 6,476,565 B1 | 11/2002 | Kaminski |
| 6,693,382 B2 * | 2/2004 | Little .................... H05B 41/24 |
| | | 250/504 R |
| 6,696,802 B1 | 2/2004 | Lezcano et al. |
| 6,737,809 B2 * | 5/2004 | Espiau ...................... H01J 7/46 |
| | | 313/634 |
| 8,169,152 B2 * | 5/2012 | DeVincentis ......... H01J 65/042 |
| | | 313/634 |
| 8,258,687 B2 * | 9/2012 | Espiau .................. H01J 65/044 |
| | | 313/161 |
| 8,342,714 B1 * | 1/2013 | Rea ....................... F21V 11/183 |
| | | 362/264 |
| 8,344,625 B2 * | 1/2013 | Espiau .................. H01J 65/044 |
| | | 315/235 |
| 8,847,488 B2 * | 9/2014 | Doughty ............... H01J 61/125 |
| | | 313/572 |
| 8,981,663 B2 * | 3/2015 | Hollingsworth ........ H01J 65/04 |
| | | 315/248 |
| 9,224,568 B2 * | 12/2015 | Doughty ................ H01J 61/12 |
| 9,236,238 B2 * | 1/2016 | Espiau .................. H01J 65/042 |
| 9,439,273 B2 * | 9/2016 | Borsuk ............. H05B 41/2806 |
| 9,640,380 B1 * | 5/2017 | Brockett ............... H01J 65/042 |
| 9,754,777 B1 * | 9/2017 | Matloubian ............. H01J 61/56 |
| 9,805,925 B1 * | 10/2017 | Brockett ............... H01J 65/042 |
| 9,875,887 B1 * | 1/2018 | Brockett ................ H01J 61/56 |
| 10,125,032 B2 | 11/2018 | Egner et al. |
| 2002/0047615 A1 | 4/2002 | Yokozeki et al. |
| 2003/0206833 A1 | 11/2003 | Obee et al. |
| 2008/0054813 A1 | 3/2008 | Espiau et al. |
| 2008/0264875 A1 | 10/2008 | Necamp |
| 2010/0253231 A1 * | 10/2010 | DeVincentis ......... H01J 65/044 |
| | | 315/158 |
| 2010/0295453 A1 * | 11/2010 | DeVincentis ......... H01J 65/044 |
| | | 315/149 |
| 2011/0043123 A1 | 2/2011 | Gilliard et al. |
| 2012/0014118 A1 | 1/2012 | Espiau et al. |
| 2012/0286664 A1 * | 11/2012 | Espiau .................. H01J 65/044 |
| | | 315/111.01 |
| 2013/0040529 A1 * | 2/2013 | Guthrie .................... H01J 65/00 |
| | | 445/40 |
| 2014/0117848 A1 * | 5/2014 | Meyer ................... H01J 61/125 |
| | | 313/643 |
| 2014/0125225 A1 * | 5/2014 | Calame ................. H01J 65/044 |
| | | 315/34 |
| 2014/0145601 A1 * | 5/2014 | Goscha .................. H01J 61/56 |
| | | 315/51 |
| 2014/0145606 A1 * | 5/2014 | Goscha ..................... H01J 5/54 |
| | | 315/53 |
| 2014/0368109 A1 * | 12/2014 | Goscha .................. H01J 61/28 |
| | | 315/34 |
| 2019/0096656 A1 * | 3/2019 | Do ........................ H01J 65/044 |

FOREIGN PATENT DOCUMENTS

| | | |
|---|---|---|
| GB | 2 399 216 A | 9/2004 |
| WO | 2013/136187 A2 | 9/2013 |
| WO | 2015/162089 A1 | 10/2015 |

OTHER PUBLICATIONS

U.S. Appl. No. 15/719,485 not yet published; 29 pages, filed Sep. 28, 2017.

* cited by examiner

ELECTRODELESS LAMP SYSTEM AND METHODS OF OPERATION

TECHNICAL FIELD

Embodiments of the subject matter described herein relate generally to lighting apparatus, and more particularly to lighting apparatus that include electrodeless lamps.

BACKGROUND

An electrodeless lamp is a gas discharge lamp that includes a sealed transparent bulb filled with an ionized gas (e.g., a plasma) that may be excited by an electric or magnetic field. Unlike a typical gas discharge lamp in which current is passed between internal electrodes at opposite ends of a bulb, the electric or magnetic field that is used to excite the gas within the bulb of an electrodeless lamp is provided from a source outside the interior of the bulb.

The wavelength of the light emitted by an electrodeless bulb depends on the composition of the gas. In some applications, electrodeless lamps are used to generate ultraviolet (UV) radiation, and in other applications, electrodeless lamps are used to generate light within the visible spectrum.

Electrodeless lamps are well suited for certain applications. However, conventional electrodeless lamp systems tend to have poor system efficiency.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
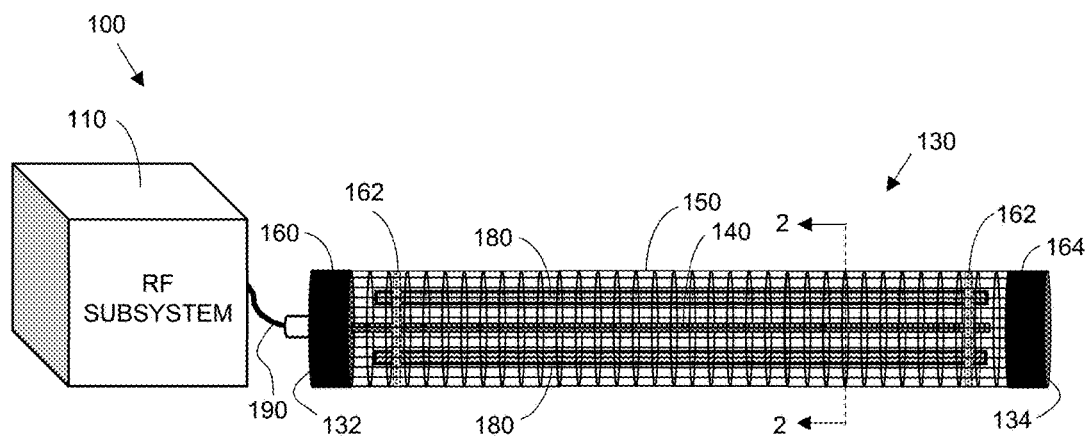
FIG. 1 is a side view of an electrodeless lamp system, in accordance with an example embodiment.

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of the subject matter described herein relate to electrodeless lamp systems in which radio frequency (RF) energy is capacitively coupled into an electrodeless bulb. Essentially, an electrodeless bulb is positioned in a cavity between two electrodes: an "active electrode" (or anode); and a "grounded electrode" (or cathode). The active and grounded electrodes essentially function as capacitor plates, and the air (or other medium) plus the electrodeless bulb essentially function as the capacitor dielectric. The cavity is at least partially defined by the distance between the two electrodes, and that distance is less than one wavelength for the range of operational frequencies of the system. Accordingly, the cavity is quasi-resonant (or sub-resonant) within the operational frequency range.

An RF signal source provides an RF signal to the active electrode. The grounded electrode is electrically coupled to ground or to a voltage reference other than ground. According to an embodiment, the frequency of the RF signal provided to the active electrode is significantly lower than frequencies used to excite gasses in conventional electrodeless lamp systems. For example, conventional systems may radiate RF signals at frequencies of 1000 megahertz (MHz) and higher in order to excite the gasses within an electrodeless bulb. In contrast, embodiments of electrodeless lamp systems described herein may utilize RF signals at frequencies of 300 MHz or less, and with the above-described system configuration, these lower frequencies are sufficient to excite the gasses within the electrodeless bulbs due to the capacitive coupling of the RF energy into the bulb. Because embodiments of the system configuration enable RF signals to be used with relatively low operational frequencies, the system may have significantly higher efficiency than is possible with conventional systems.

Embodiments further include a feedback and control sub-system, and a variable resonant circuit coupled between the RF signal source and the active electrode. The feedback and control sub-system may continuously or periodically monitor the intensity of the electric field within the cavity (or the luminous/radiation intensity), and may dynamically reconfigure the variable resonant circuit to ensure that high efficiency operation is achieved throughout system operation (e.g., including through the system start-up process during which the bulb resonance may vary significantly). More specifically, based on feedback indicating the electric field intensity (or luminous/radiation intensity) within the cavity, a system controller may alter passive component values within the variable resonant circuit to better match the variable resonance of the bulb(s), which in turn may cause the electric field intensity to increase or decrease, thus increasing or decreasing the intensity of light or radiation emitted by each electrodeless lamp tube. This adaptive resonance control may enable the system to achieve optimal performance (e.g., highest luminous/radiation output, longer operational lifetime for the bulb, and so on) throughout all phases of operation, and additionally may facilitate reductions in system start-up time.

As will be described in more detail later, the various embodiments may be incorporated into a variety of different types of systems to achieve different results. For example, embodiments of electrodeless lamp systems discussed herein may be configured to output ultraviolet light, which is known to disinfect air, water, and other mediums. Thus, the electrodeless lamp embodiments discussed herein may be incorporated into air purification systems, such as stand-alone air purification or filtration units or air purification units that are incorporated into other appliances or devices (e.g., refrigerators, freezers, vacuum cleaners, air conditioning units, and so on). In addition, embodiments of electrodeless lamp systems discussed herein may be incorporated into water purification systems, such as stand-alone water purification units, waste water treatment systems, and appliances that dispense or utilize water (e.g., refrigerator units, and so on). Alternate embodiments may be configured to output light in the visible spectrum, and such embodiments may be utilized for general ambient lighting purposes.

Figure 2:
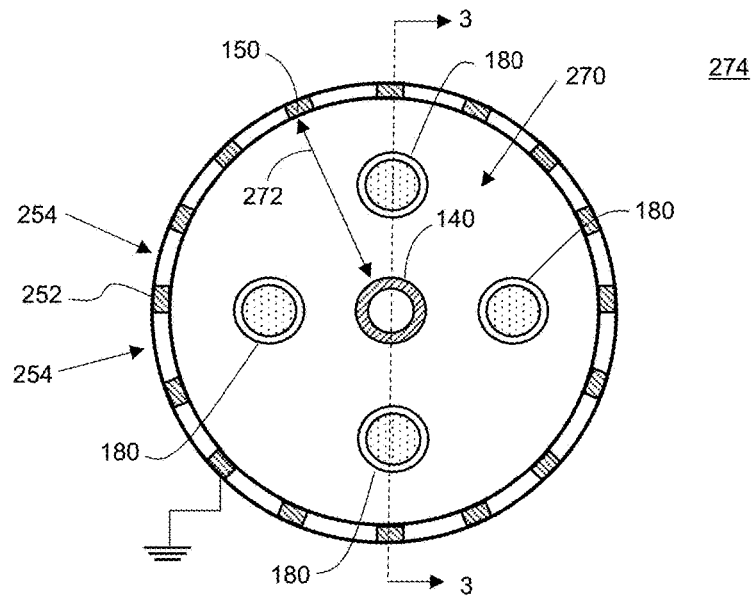
FIG. 2 is a cross-sectional side view of a portion of an electrodeless lamp system along line 2-2 of FIG. 1, in accordance with an example embodiment.
Figure 3:
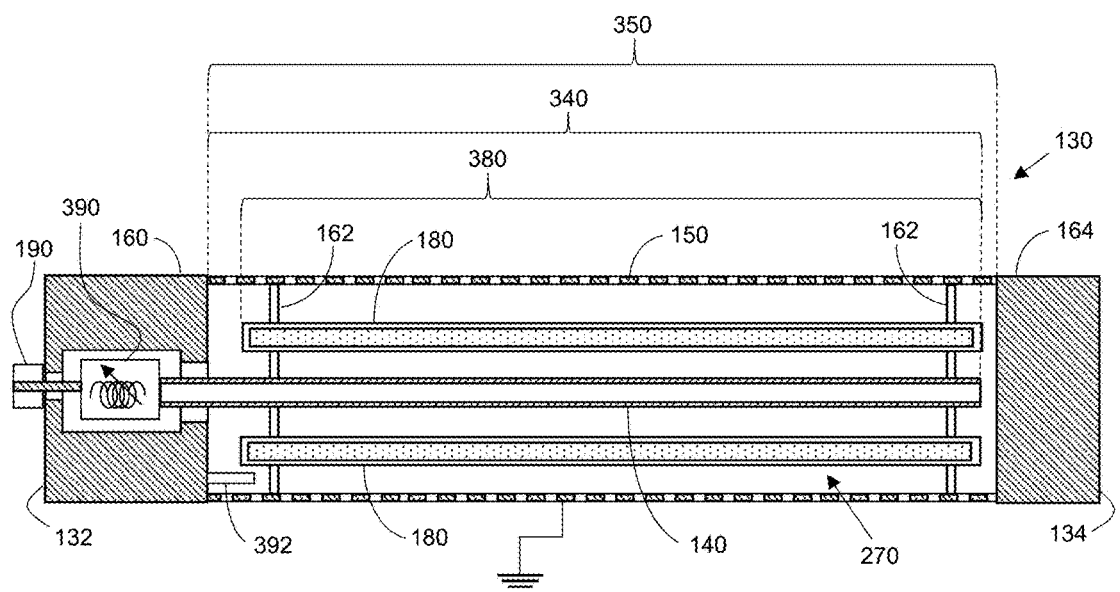
FIG. 3 is a cross-sectional, side view of a portion of an electrodeless lamp system along line 3-3 of FIG. 2, in accordance with an example embodiment.

FIG. 1 is a side view of an electrodeless lamp system 100, in accordance with an example embodiment. FIG. 1 should be viewed in conjunction with FIGS. 2 and 3, which include various cross-sectional views of the electrodeless lamp system 100. More specifically, FIG. 2 is a cross-sectional side view of a portion of the electrodeless lamp system 100 along line 2-2 of FIG. 1, and FIG. 3 is a cross-sectional side view of a portion of the electrodeless lamp system 100 along line 3-3 of FIG. 2.

Electrodeless lamp system 100 includes an RF signal source and controller subsystem 110 (herein "RF subsystem") and a lamp containment and excitation structure 130 (herein "lamp excitation structure"). The lamp excitation structure 130 includes first and second electrodes 140, 150. In addition, the lamp excitation structure 130 includes a housing 160 configured to hold the electrodes 140, 150 in a fixed physical position with respect to each other, in order to define a cavity 270 between the electrodes 140, 150. Accordingly, the electrodes 140, 150 are positioned on opposing sides of the cavity 270. One or more electrodeless bulbs 180 are positioned within the cavity 270 between the electrodes 140, 150. Although the example embodiment shown in FIGS. 1-3 include four bulbs 180, alternate embodiments may have any number of bulbs in a range of one bulb to 50 bulbs or more.

The RF subsystem 110 is electrically coupled to the first electrode 140, and the second electrode 150 is electrically coupled to an electrical ground reference, in an embodiment. The first and second electrodes 140, 150 are physically coupled to and extend from housing 160, in an embodiment. A cap 164 may be connected to an opposite end of the second electrode 150 to provide additional physical support to the second electrode 150. One or more lamp support components 162 disposed along the length of the first and second electrodes 140, 150 hold the one or more electrodeless bulbs 180 in a fixed physical position within the cavity 270 between the electrodes 140, 150. For example, the lamp support components 162 may include discs with diameters that are about equal to the inner diameter of the second electrode 150, and each disc may include apertures sized to accept insertion of the first electrode 140 and the electrodeless bulbs 180. Other embodiments may include differently configured lamp support components.

According to an embodiment, the first electrode 140 is formed from an elongated conductive component, which extends from a first end 132 toward or to a second end 134 of the lamp excitation structure 130. The first electrode 140 may be a solid conductive structure (e.g., a rod) or a hollow conductive structure (e.g., a tube). In some embodiments, the first electrode 140 may be formed from a homogenous conductive material (e.g., copper or another conductive material). In other embodiments, the first electrode 140 may be a composite structure with a conductive outer surface. In various embodiments, an outer diameter of the first electrode 140 may be in a range of about 5 centimeters (cm) to about 15 cm, although the diameter may be smaller or larger, as well.

According to an embodiment, the second electrode 150 is formed from an elongated, tubular, optically-porous or optically-transparent conductive component, which also extends from the first end 132 toward or to the second end 134 of the lamp excitation structure 130. For example, the second electrode 150 may be formed from a conductive mesh (e.g., with a "chicken wire" configuration) that is bent into a tubular shape. As such, the second electrode 150 includes a plurality of interconnected conductive structures 252 (e.g., wires) and a plurality of apertures or holes 254. The conductive structures 252 are electrically coupled together and to an electrical ground reference, in an embodiment, and the holes 254 enable light or radiation generated by the electrodeless bulbs 180 to exit the cavity 270 into the surrounding environment 274 outside of the system 100. In various embodiments, an inner diameter of the second electrode 150 may be in a range of about 10 cm to about 1.5 meters, and a thickness of the second electrode 150 may be in a range of about 0.5 millimeters (mm) to about 2.0 mm, although the diameter or thickness may be smaller or larger, as well.

The first and second electrodes 140, 150 are separated across the cavity 270 by a distance 272, which corresponds to one dimension of the cavity 270. Essentially, the first and second electrodes 140, 150 at least partially bound the cavity 270, where the outer surface of the first electrode 140 is one boundary, and the inner surface of the second electrode 150 is a second boundary. According to an embodiment, the first electrode 140 is positioned in the center of the cavity 270 bounded by the second electrode 150. In other embodiments, the first electrode 140 may be off-center.

Desirably, the first and second electrodes 140, 150 have lengths 340, 350 that are as long or longer than a length 380 of the electrodeless bulbs 180 so that the entire length of each electrodeless bulb 180 may be positioned in the cavity 270 directly between the first and second electrodes 140, 150. In other embodiments, the electrodeless bulbs 180 may be longer than either or both of the first and/or second electrodes 140, 150. In various embodiments, the lengths 340, 350, 380 of the electrodes 140, 150 and/or electrodeless bulbs 180 may be in a range of about 5 cm to about 1.5 meters, although the lengths may be smaller or larger, as well.

A connector 190 is coupled between the RF subsystem 110 and the lamp excitation structure 130 (or more particularly the housing 160). The connector 190 may include a plurality of conductors, such as a first conductor for conveying an RF signal, a second conductor for connecting to a ground reference voltage, and one or more additional conductors for conveying signals between system components, as will be discussed in more detail below.

The RF subsystem 110 is configured to produce an RF signal, which is conveyed to the first electrode 140 through one of the conductors within connector 190. The first electrode 140 is configured to radiate electromagnetic energy into the cavity 270 in response to receiving the RF signal. Accordingly, the first electrode 140 generates an electric field that extends into the cavity 270 (and thus through the electrodeless bulb(s) 180) to impinge on the second electrode 150.

In an embodiment, the RF subsystem 110 is configured to produce the RF signal at an operational frequency in a range of about 10 MHz to about 100 MHz, and/or a range of about 100 MHz to about 3 gigahertz (GHz), although the range of operational frequencies may be different, in other embodiments. As discussed above, the first and second electrodes 140, 150 are separated across the cavity 270 by distance 272. For example, the distance 272 may be in a range of about 10 centimeters (cm) to about 3.0 meters or more. According to an embodiment, distance 272 is less than the wavelength of the RF signal produced by the RF subsystem 110. In other words, the cavity 270 is a sub-resonant cavity. In some embodiments, the distance 272 is less than about half the wavelength of the RF signal. In other embodiments, the distance 272 is less than about one quarter the wavelength of the RF signal. In still other embodiments, the distance 272 is less than about one eighth the wavelength of the RF signal. In still other embodiments, the distance 272 is less than about one 50th the wavelength of the RF signal. In still other embodiments, the distance 272 is less than about one 100th the wavelength of the RF signal.

In general, a system 100 designed for lower operational frequencies (e.g., frequencies between 10 MHz and 30 MHz) may be designed to have a distance 272 that is a relatively smaller fraction of the wavelength. For example, when system 100 is designed to produce an RF signal with an operational frequency of about 10 MHz (corresponding to a wavelength of about 30 meters), and distance 272 is selected to be about 0.5 meters, the distance 272 is about one 60th the wavelength of the RF signal. Conversely, when system 100 is designed for an operational frequency of about 300 MHz (corresponding to a wavelength of about 1 meter), and distance 272 is selected to be about 0.5 meters, the distance 272 is about one half the wavelength of the RF signal.

With the operational frequency and the distance 272 between electrodes 140, 150 being selected to define a sub-resonant cavity 270, electromagnetic energy radiated by the first electrode 140 is capacitively coupled into the electrodeless bulbs 180. Accordingly, the first electrode 140 may be analogized to a first plate of a capacitor (or a capacitor anode), the second electrode 150 may be analogized to a second plate of a capacitor (or a capacitor cathode), and the air within the cavity 270 plus the electrodeless bulbs 180 may be analogized to a capacitor dielectric. Accordingly, the first electrode 140 alternatively may be referred to herein as an "anode" or "active electrode," and the second electrode 150 may alternatively be referred to herein as a "cathode" or "grounded electrode."

Essentially, the voltage across the first and second electrodes 140, 150 enables activation of the electrodeless bulb(s) 180. According to various embodiments, the RF subsystem 110 is configured to generate the RF signal to produce voltages across the electrodes 140, 150 in a range of about 90 volts to about 3000 volts, although the system may be configured to produce lower or higher voltages across electrodes 140, 150, as well. At relatively low voltages, each tube 180 may begin to emit light/radiation, and as the voltage is increased, the intensity of the light/radiation also increases up until the tube 180 is saturated (i.e., the luminous/radiation intensity reaches a plateau and does not increase with increasing voltage).

Figure 5:
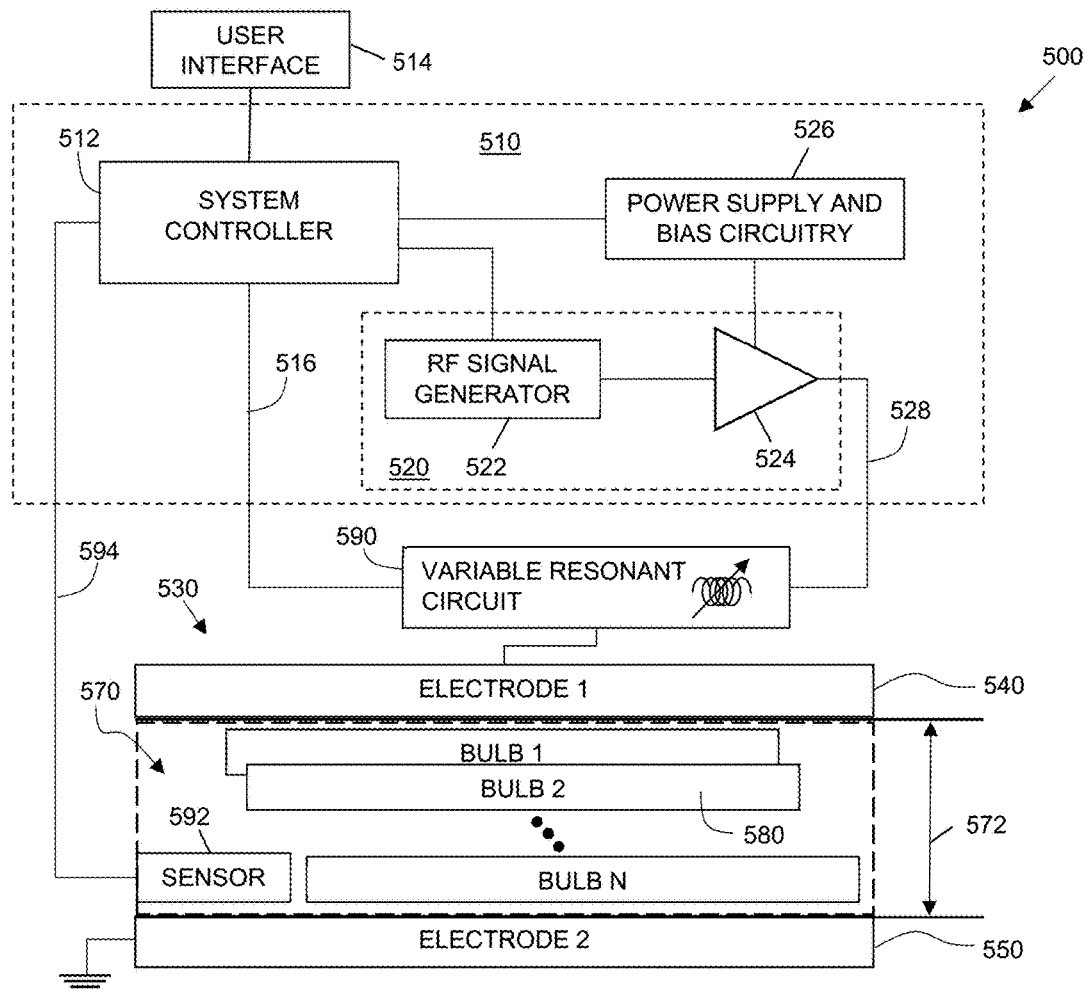
FIG. 5 is a simplified block diagram of an electrodeless lamp system, in accordance with an example embodiment.

According to an embodiment, the system 100 also may include a feedback and control subsystem that includes a variable resonant circuit 390 (e.g., variable resonant circuit 590, 600, FIGS. 5, 6), a sensor 392 (e.g., an electric field and/or light/radiation sensor, such as sensor 592, FIG. 5), and a feedback circuit (e.g., including feedback path 594, FIG. 5). As will be explained in more detail later, the variable resonant circuit 390, which is electrically coupled between the RF subsystem 110 and the first electrode 140, is configured to resonate at and near the resonance of the electrodeless bulb(s) 180, and to provide an impedance transformation between the output impedance of the RF subsystem 110 and the input impedance of the first electrode 140 (plus the cavity 270 and the electrodeless bulbs 180). The sensor 392 is located within or in proximity to the cavity 270, and is configured to sense an electric field intensity within the cavity 270 and/or an intensity of light/radiation emitted by the electrodeless bulb(s) 180. The feedback circuit is electrically coupled between the sensor 392 and the RF subsystem 110, and is configured to convey a feedback signal indicating the sensed intensity to the RF subsystem 110 (e.g., through connector 190). Based on the feedback signal, a controller (e.g., controller 510, FIG. 5) within the RF subsystem 110 may alter the characteristics of the RF signal provided to the first electrode 140. For example, the controller may vary the RF signal frequency or amplitude. In addition or alternatively, the controller may send control signals to the variable resonant circuit (e.g., through one or more conductors of connector 190) to change the resonant frequency of the variable resonant circuit 390 to better match the current resonant frequency of the bulb(s) 180. The resonant frequency of the electrodeless bulbs 180 may vary during system startup and operation. According to an embodiment, and as will be described in more detail later in conjunction with FIG. 7, the feedback and control subsystem may enable the system 100 to operate efficiently throughout all phases of operation by altering the resonant frequency of the variable resonant circuit 390 based on the sensed electric field and/or luminous/radiation intensities.

Figure 4:
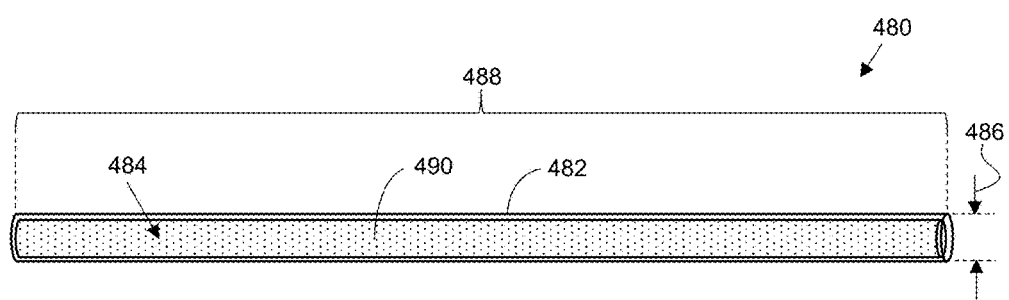
FIG. 4 is a cross-sectional side view of an electrodeless bulb, in accordance with an example embodiment.

FIG. 4 is a cross-sectional side view of an electrodeless bulb 480 (e.g., electrodeless bulb 180, FIG. 1) that may be suitable for use in system 100, in accordance with an example embodiment. Electrodeless bulb 480 is a gas discharge bulb, which includes a hermetically sealed, hollow transparent sleeve 482 (defining a cavity 484) that encloses a gas 490. According to an embodiment, the cavity 484 is completely sealed, and is devoid of internal electrodes or other components.

For example, the transparent sleeve 482 may be formed from quartz, glass, crystalline materials, or other suitable materials. One or more films or coatings (not shown) may be disposed on the inner and/or outer surfaces of the sleeve 482. The sleeve 482 dimensions are defined by an outer diameter 486 and a length 488. For example, the diameter 486 may be in a range of about 1 cm to about 2.5 cm, and the length 488 may be in a range of about 5 cm to about 1.5 meters, in various embodiments. In other embodiments, the diameter 486 and/or length 488 may be larger and/or smaller than the above-given example ranges. In addition, although the embodiment of sleeve 482 in FIG. 4 has a straight tubular shape, the shape of the sleeve 482 may be different, as well. For example, other embodiments of a sleeve may be curved, the diameter of the sleeve may vary along its length, the sleeve may have an annular ring shape, and so on.

The gas 490 contained within the sleeve 482 may include one or more ionized noble gasses (e.g., argon, neon, krypton, xenon), which are configured to emit light (or radiation) when irradiated with microwave energy. In various embodiments, the gas 490 within bulb 480 may be configured to output ultraviolet radiation. For example, when appropriately irradiated, the gas 490 may have significant spectral output intensities at wavelengths in a range of about 100 nanometers (nm) to about 400 nm. In such embodiments, the system (e.g., system 100) within which the bulb 480 is used may be configured to sanitize air, liquids (e.g., water), slurries, or other mediums that come into proximity or contact with the bulb 480 or system. Non-limiting example systems are described later in conjunction with FIGS. 8-10. In other embodiments, the gas 490 may be configured to output light in the visible spectrum (e.g., fluorescent light). In such embodiments, the system (e.g., system 100) within which the bulb 480 is used may be configured to provide ambient lighting.

One or more additional substances, which vaporize during startup to become part of gas 490, also may be contained within the sleeve 482. For example, such additional materials may include mercury, sodium, sulfur, gallium, iron, indium, metal halides, and/or other suitable materials. The additional material(s) may alter the spectral output of the gas 490.

FIG. 5 is a simplified block diagram of an electrodeless lamp system 500 (e.g., system 100, FIG. 1), in accordance with an example embodiment. It should be understood that FIG. 5 is a simplified representation of an electrodeless lamp system 500 for purposes of explanation and ease of description, and that practical embodiments may include other devices and components to provide additional functions and features, and/or the electrodeless lamp system 500 may be part of a larger electrical system.

Electrodeless lamp system 500 includes an RF subsystem 510 (e.g., RF subsystem 110, FIG. 1), a user interface 514, and a lamp excitation structure 530 (e.g., lamp excitation structure 130, FIG. 1). According to an embodiment, system 500 also includes a resonant circuit 590 (e.g., resonant circuit 390, FIG. 3) electrically coupled between an output of the RF subsystem 510 and the lamp excitation structure 530. Further, system 500 may include a sensor 592 and a feedback path 594, which is configured to provide sensor signals that are used by the RF subsystem 510 to control the variable resonant circuit 590.

User interface 514 may correspond to a control panel, for example, which enables a user to activate the system 500, and to provide inputs regarding operational parameters (e.g., the duration of system activation, and so on). In addition, the user interface may be configured to provide user-perceptible outputs indicating the operational status of the system and other information.

The RF subsystem 510 includes a system controller 512, an RF signal source 520, and power supply and bias circuitry 526, in an embodiment. In alternate embodiments, the RF subsystem 510 may have multiple RF signal sources and/or power supply and bias circuits. System controller 512 may include one or more general purpose or special purpose processors (e.g., a microprocessor, microcontroller, Application Specific Integrated Circuit (ASIC), and so on), volatile and/or non-volatile memory (e.g., Random Access Memory (RAM), Read Only Memory (ROM), flash, various registers, and so on), one or more communication busses, and other components. According to an embodiment, system controller 512 is coupled to user interface 514, RF signal source 520, power supply and bias circuitry 526, variable resonant circuit 590, and sensor 592 (if included). System controller 512 is configured to receive signals indicating user inputs received via user interface 514, and to receive sensor signals from sensor 592. Responsive to the received signals and measurements, and as will be described in more detail later, system controller 512 provides control signals to the power supply and bias circuitry 526 and to the RF signal generator 522 of the RF signal source 520. In addition, system controller 512 provides control signals to the variable resonant circuit 590, which cause the circuit 590 to change its state or configuration.

The lamp excitation structure 530 includes first and second electrodes 540, 550 (e.g., electrodes 140, 150, FIG. 1), which are positioned in a fixed physical relationship with respect to each other on either side of a cavity 570 (e.g., cavity 270, FIG. 2) between the electrodes 540, 550. One or more electrodeless bulbs 580 (e.g., bulbs 180, FIG. 1) are positioned within the cavity 570 between the electrodes 540, 550. As discussed previously, a distance 572 between the electrodes 540, 550 renders the cavity 570 a sub-resonant cavity.

An output of the RF subsystem 510, and more particularly an output of RF signal source 520, is electrically coupled to the first electrode 540 through a conductive transmission path 528 (e.g., which extends through connector 190, FIG. 1), and through the variable resonant circuit 590. The second electrode 550 is electrically coupled to an electrical ground reference, in an embodiment. For example, the electrical ground reference may be coupled to the second electrode 550 through another conductor (not illustrated, but that also may extend through connector 190, FIG. 1).

Cavity 570 and the bulb(s) 580 positioned in the cavity 570 present a cumulative load for the electromagnetic energy (or RF power) that is radiated into the cavity 570 by the first electrode 540. More specifically, the cavity 570 and the bulb(s) 580 present an impedance to the system, referred to herein as a "cavity input impedance." The cavity input impedance changes during a lighting operation as the operational state of the bulb(s) 580 changes. In addition, the cavity input impedance may change as the characteristics of any media (e.g., air, water, or other media) within the cavity 570 changes. According to an embodiment, sensor 592 sends sensor signals over feedback path 594 to the system controller 512, which indicate sensed electromagnetic field intensity and/or luminous/radiation intensity within or proximate to the cavity 570. In response to receiving the sensor signals, the system controller 512 may alter the state of the variable resonant circuit 590. More specifically, the system controller 512 may provide control signals over control path 516 to the variable resonant circuit 590, which cause the variable resonant circuit 590 to vary the inductive, capacitive, and/or resistive values of one or more components within the circuit 590, thus adjusting the resonant frequency of the circuit 590. Adjustment of the resonant frequency to better match the then-current resonant frequency of the bulb(s) 580 may increase the luminous/radiation intensity within the cavity 570. In addition, the system 500 may be configured to provide frequency and/or phase adjustment to the RF signal, as well. This may be particularly beneficial, for example, in systems in which more than one electrode within a cavity is used to radiate RF energy. The feedback path 594 and the control path 516 also may extend through dedicated conductors (e.g., which also may extend through connector 190, FIG. 1).

As mentioned above, the first electrode 540 is electrically coupled to the RF signal source 520 through the resonant circuit 590 (e.g., resonant circuit 390, FIG. 3 or 600, FIG. 6) and a transmission path 528 (e.g., yet another conductor that extends through connector 190, FIG. 1), in an embodiment. As will be described in more detail later, the resonant circuit 590 is configured to resonant at a frequency that is close to the resonant frequency of the bulb(s) 580. In an embodiment, the resonant circuit 590 includes a network of passive components (e.g., inductors, capacitors, resistors). For example, the resonant circuit 590 may be configured to have a maximum resonance within a frequency range that encompasses the resonant frequencies of the bulb(s) through all luminous states of the bulb(s). For example, the resonant circuit 590 may be configured to have a maximum resonance in a range of about 10.0 MHz to about 100 MHz and/or from about 100 MHz to about 3.0 GHz, although the maximum resonance may occur at frequencies outside of this range, as well.

The variable resonant circuit 590 may have any of a variety of configurations. For example, the circuit 590 may include any one or more circuits selected from an inductance/capacitance (LC) network, a series inductance network, a shunt inductance network, or a combination of bandpass, high-pass and low-pass circuits, in various embodiments. According to more specific embodiments, the variable resonant circuit 590 includes a variable inductance network (e.g., network 600, FIG. 6), which may be located in the housing (e.g., housing 160, as shown in FIG. 3), or alternatively in the cavity 570 or in the RF subsystem 510 (e.g., RF subsystem 110, FIG. 1). The inductance, capacitance, and/or resistance values provided by the variable resonant circuit 590, which in turn affect the resonant frequency of the circuit 590, may be fixed, or may be established using control signals from the system controller 512, as will be described in more detail later. In any event, by changing the state of the variable resonant circuit 590 over the course of a lighting operation to dynamically match the ever-changing bulb resonant frequency, the system efficiency may be maintained at a high level despite variations in the bulb resonant frequency during the lighting operation.

According to an embodiment, RF signal source 520 includes an RF signal generator 522 and a power amplifier 524 (e.g., including one or more power amplifier stages). In response to control signals provided by system controller 512, RF signal generator 522 is configured to produce an oscillating electrical signal having a frequency in an ISM (industrial, scientific, and medical) band, although the system could be modified to support operations in other frequency bands, as well. The RF signal generator 522 may be controlled to produce oscillating signals of different power levels and/or different frequencies, in various embodiments. For example, the RF signal generator 522 may produce a signal that oscillates in a range of about 10 MHz to about 100 MHz, and/or from about 100 MHz to about 3.0 GHz. Some desirable frequencies may be, for example, 13.56 MHz (+/−5 percent), 27.125 MHz (+/−5 percent), 40.68 MHz (+/−5 percent), and 2.45 GHz (+/−5 percent). Alternatively, the frequency of oscillation and/or the power level may be lower or higher than the above-given ranges or values.

The power amplifier 524 is configured to receive the oscillating signal from the RF signal generator 522, and to amplify the signal to produce a significantly higher-power signal at an output of the power amplifier 524. For example, the output signal may have a power level in a range of about 1 watt to about 1000 watts or more. The gain applied by the power amplifier 524 may be controlled using gate bias voltages and/or drain supply voltages provided by the power supply and bias circuitry 526 to each stage of amplifier 524. More specifically, power supply and bias circuitry 526 provides bias and supply voltages to each RF amplifier stage in accordance with control signals received from system controller 512.

In an embodiment, each stage of amplifier 524 is implemented as a power transistor, such as a field effect transistor (FET), having an input terminal (e.g., a gate or control terminal) and two current carrying terminals (e.g., source and drain terminals). Impedance matching circuits (not illustrated) may be coupled to the input (e.g., gate) and/or output (e.g., drain terminal) of some or all of the amplifier stages, in various embodiments. In an embodiment, each transistor of the amplifier stages includes a laterally diffused metal oxide semiconductor FET (LDMOSFET) transistor. However, it should be noted that the transistors are not intended to be limited to any particular semiconductor technology, and in other embodiments, each transistor may be realized as a gallium nitride (GaN) transistor, another type of MOSFET transistor, a bipolar junction transistor (BJT), or a transistor utilizing another semiconductor technology.

In FIG. 5, the power amplifier arrangement 524 is depicted to include one amplifier stage coupled in a particular manner to other circuit components. In other embodiments, the power amplifier arrangement 524 may include other amplifier topologies and/or the amplifier arrangement may include two or more amplifier stages. For example, the power amplifier arrangement may include various embodiments of a single ended amplifier, a double ended amplifier, a push-pull amplifier, a Doherty amplifier, a Switch Mode Power Amplifier (SMPA), or another type of amplifier.

As mentioned above, some embodiments of system 500 may include electromagnetic field sensor(s), ultraviolet radiation sensor(s), luminous intensity sensors, and/or other types of sensors 592. The sensor(s) 592 may be positioned in locations that enable the electromagnetic field intensity and/or the ultraviolet radiation intensity and/or the luminous intensity within the cavity 570 be sensed during a lighting operation. When provided to the system controller 512 through the feedback path 594, the electromagnetic field intensity and/or luminous/radiation intensity information enables the system controller 512 to alter the power of the RF signal supplied by the RF signal source 520 (e.g., by controlling the bias and/or supply voltages provided by the power supply and bias circuitry 526), and/or to adjust the state of the variable resonant circuit 590.

As discussed above, the resonant circuit 590 may be a fixed or variable resonant circuit, in various embodiments, which is used to match the dynamic resonance of the bulb(s) 580 to maximize, to the extent possible, the intensity of the light/radiation emitted by the bulb(s) 580. The initial resonant frequency of the bulb(s) 580 may not be known with accuracy at the beginning of a lighting operation. Further, the resonant frequency of the bulb(s) 580 changes during a lighting operation as the bulb(s) 580 transition from a fully off state to a fully on state (e.g., during system startup). According to an embodiment, the resonant circuit 590 is a variable resonant circuit, and the system controller 512 may provide control signals to the variable resonant circuit 590 that cause modifications to the state of the variable resonant circuit 590. This enables the system controller 512 to establish an initial state of the variable resonant circuit 590 (i.e., an initial resonant frequency) at the beginning of the lighting operation and to modify the state of the variable resonant circuit 590 so that an adequate match between the circuit 590 and bulb 580 resonance may be maintained throughout the lighting operation, despite changes in the resonant frequency of the bulb(s) 580.

According to an embodiment, the resonant circuit 590 may include a network of passive components, such as inductors, capacitors, and resistors, as described above. In a particular embodiment, the circuit 590 may include a network of inductors (e.g., fixed or variable inductance networks) and capacitors (e.g., fixed or variable capacitors). As used herein, the term "inductor" means a discrete inductor or a set of inductive components that are electrically coupled together without intervening components of other types (e.g., resistors or capacitors). Similarly, the term "capacitor" means a discrete capacitor, a capacitive structure formed from multiple conductive structures separated by a dielectric (e.g., air, dielectric material, or another dielectric medium) or a set of capacitive components that are electrically coupled together without intervening components of other types (e.g., resistors or inductors).

Figure 6:
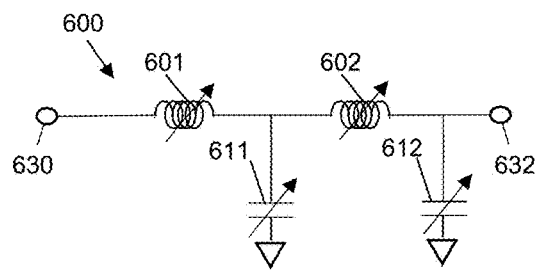
FIG. 6 is a schematic diagram of a variable resonant circuit, in accordance with an example embodiment.

FIG. 6 is a schematic diagram of a variable resonant circuit 600 that may be incorporated into an electrodeless lamp system (e.g., system 100, 500, FIGS. 1, 5), in accordance with an example embodiment. According to an embodiment, the variable resonant circuit 600 includes a network of series-coupled inductive components that may provide inductances in a range of about 20 nanohenries (nH) to about 400 nH, although the range may extend to lower or higher inductance values, as well.

Network 600 includes an input node 630, an output node 632, and one or more (e.g., 1, 2, or more than 2) discrete inductors 601, 602 coupled in series with each other between the input and output nodes 630, 623. In addition, network 600 includes one or more (e.g., 1, 2, or more than 2) of capacitors 611, 612, where each capacitor 611, 612 is coupled in a shunt configuration to a ground reference. Inductors 601, 602 may be implemented as discrete inductors, as distributed inductors (e.g., printed coils), as wirebonds, or in other ways. Capacitors 611, 612 may be implemented as discrete capacitors, or may be formed from capacitive coupling between conductive system components over an air or dielectric material medium. When inductors 601, 602, capacitors 611, 612, or both are variable, the inductance or capacitance value of each component 601, 602, 611, 612 is controlled using control signals from the system controller (e.g., system controller 512, FIG. 5). For example, the control signals may be conveyed through a control path (e.g., path 516, FIG. 5).

By varying the total inductance and/or capacitance values of network 600, the system controller may move the resonant frequency of the network 600 toward or away from the resonant frequency of the electrodeless bulbs (e.g., bulbs 180, 580, FIGS. 1, 5). This may improve or degrade the resonant frequency match, where the improvement or degradation is evidenced by additional electromagnetic field intensity and/or luminous/radiation intensity measurements. In most cases, the system controller may strive to configure the network 600 in a state in which a maximum electromagnetic field intensity and/or maximum luminous/radiation intensity is achieved (i.e., a state in which the resonant frequency of the variable resonant circuit is substantially equal to the resonant frequency of the bulb).

Referring again to FIG. 1, and in the embodiments described above, the first and second electrodes (e.g., electrodes 140, 150, FIG. 1) are depicted with particular example physical forms (e.g., a rod shaped structure and a tubular shaped structure, respectively). As alluded to in FIG. 5, the first and second electrodes may have other physical forms, in other embodiments. For example, either or both electrodes may have planar forms. For example, the first electrode 540 may be configured as a conductive plate, and/or the second electrode 550 may be configured as a planar conductive mesh.

In addition, in the above-described embodiments, the first electrode (e.g., electrode 140, 540, FIGS. 1, 5) is electrically connected to the RF subsystem (e.g., RF subsystem 110 or RF signal source 520, FIGS. 1, 5), and the second electrode (e.g., electrode 150, 550, FIGS. 1, 5) is connected to a ground reference. In an alternate embodiment, the RF subsystem is electrically coupled to the second electrode, and the first electrode is electrically coupled to the ground reference.

Figure 7:
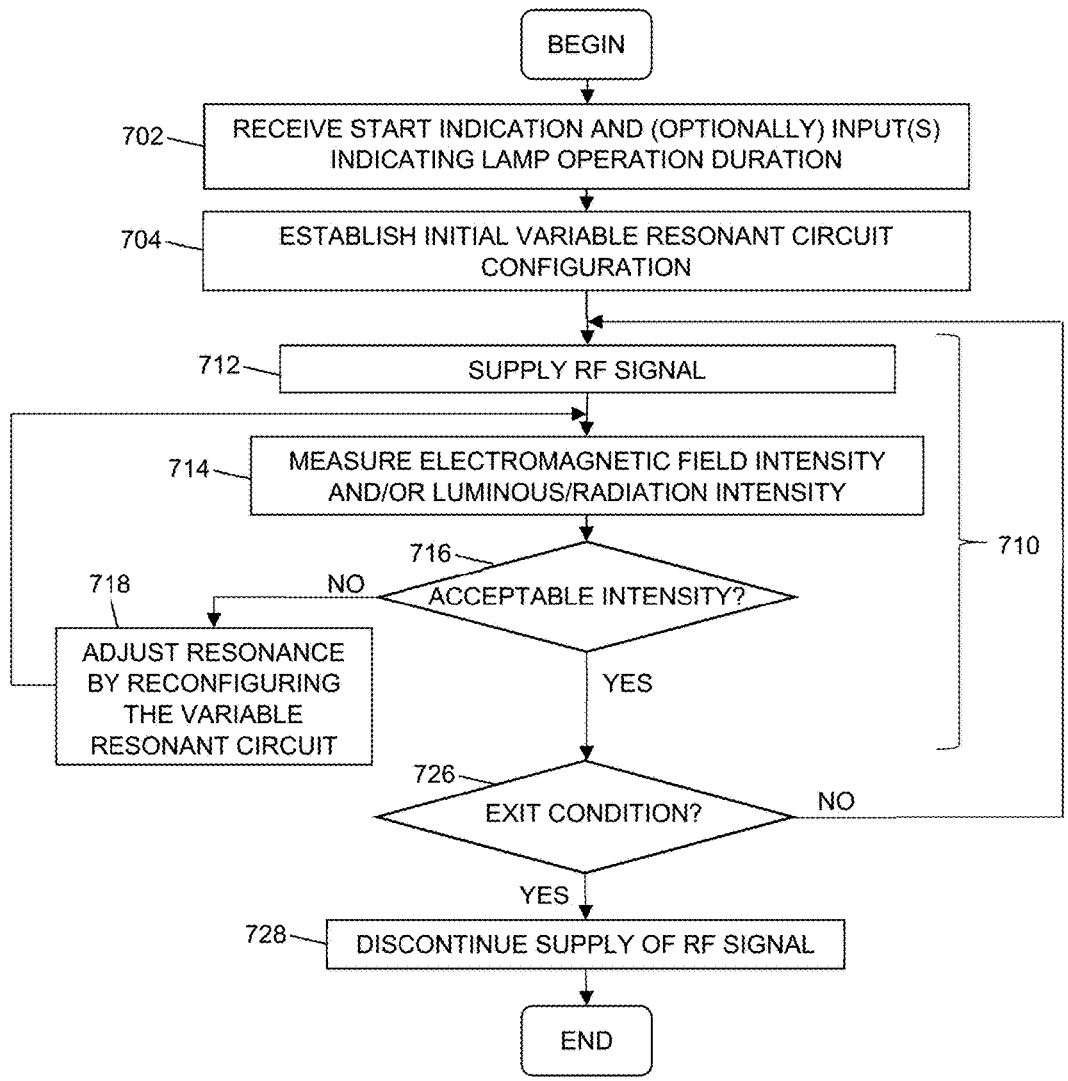
FIG. 7 is a flowchart of a method of operating an electrodeless lamp system, in accordance with an example embodiment.

Now that embodiments of the electrical and physical aspects of electrodeless lighting systems have been described, various embodiments of methods for operating such electrodeless lamp systems will now be described in conjunction with FIG. 7. More specifically, FIG. 7 is a flowchart of a method of operating an electrodeless lamp system (e.g., system 100, 500, FIGS. 1, 5), in accordance with an example embodiment.

The method may begin, in block 702, when the system controller (e.g., system controller 512, FIG. 5) receives an indication that a lighting operation should start. Such an indication may be received, for example, after a user has pressed a power button (e.g., of the user interface 514, FIG. 5). According to various embodiments, the system controller optionally may receive additional inputs, such as an indication of a desired duration of the lighting operation, a desired lighting intensity (e.g., low, medium, or high intensity), and other inputs that are relevant to the operation.

In block 704, the system controller provides control signals to the variable resonant circuit (e.g., circuit 390, 590, FIGS. 3, 5) to establish an initial configuration or state for the variable resonant circuit. As described in detail in conjunction with FIGS. 5 and 6, the control signals affect the component values within the resonant circuit (e.g., inductances, capacitances, and/or resistances). For example, the control signals may affect the component values of the inductors 601, 602, and/or capacitors 611, 612 (FIG. 6).

Typically, at the beginning of a lighting operation, as the bulb(s) begin to turn "on" and emit light or radiation, the resonant frequency of the bulb(s) is at a first frequency. Once the bulb(s) are fully "on," the resonant frequency of the bulb(s) is at a second frequency, which may be lower or higher than the first frequency. According to an embodiment, and based on the above-described, operational resonant frequency characteristics, the system controller initially sends control signals to the variable resonant circuit that configure the circuit in a state in which it has the first resonant frequency, and the system controller may send subsequent control signals to the variable resonant circuit that increase or decrease its resonant frequency as the resonant frequency of the bulb changes.

Once the initial variable resonant circuit configuration is established, the system controller may perform a process 710 of adjusting, if necessary, the configuration of the variable resonant circuit to find an acceptable or best match based on actual measurements that are indicative of the quality of the match. According to an embodiment, this process includes causing the RF signal source (e.g., RF signal source 520) to supply an RF signal through the variable resonant circuit to the first electrode (e.g., first electrode 140, 540, FIGS. 1, 5), in block 712. The system controller may control the RF signal power level through control signals to the power supply and bias circuitry (e.g., circuitry 526, FIG. 5), where the control signals cause the power supply and bias circuitry to provide supply and bias voltages to the amplifiers (e.g., amplifier 524, FIG. 5).

In block 714, electromagnetic field intensity and/or luminous/radiation intensity sensor(s) (e.g., sensor 392, 592, FIGS. 3, 5) then measure the electromagnetic field intensity and/or luminous/radiation intensity within or in proximity to the cavity (e.g., cavity 170, 570, FIGS. 1, 5), and provide those measurements to the system controller. The system controller may then determine whether the match provided by the variable resonant circuit is acceptable (e.g., the electromagnetic field and/or luminous/radiation intensity is sufficiently high). For example, the system controller may determine whether the sensed electromagnetic field intensity is above or below a threshold, and/or may determine whether the luminous/radiation intensity is above or below a threshold.

When the system controller determines that the match is not acceptable (e.g., the electromagnetic field and/or luminous/radiation intensity are below their associated thresholds), the system controller may adjust the match, in block 718, by reconfiguring the variable resonant circuit. For example, this may be achieved by sending control signals to the variable resonant circuit, which cause the circuit to increase and/or decrease the inductances, capacitances, or other component values within the circuit. This, in turn, may shift the resonant frequency of the variable resonant circuit, desirably toward the resonant frequency of the bulb(s). After reconfiguring the variable resonant circuit, blocks 714, 716, and 718 may be iteratively performed until an acceptable match between the resonant frequencies of the bulb(s) and the variable resonant circuit is determined in block 716 (or the electromagnetic field intensity and/or luminous/radiation intensity is sufficiently high).

Once an acceptable match is determined or the electromagnetic field and/or luminous/radiation intensity is sufficiently high, the system may evaluate whether an exit condition has occurred, in block 726. In actuality, determination of whether an exit condition has occurred may be an interrupt driven process that may occur at any point during the lighting process. However, for the purposes of including it in the flowchart of FIG. 7, the process is shown to occur after block 716.

For example, the system may determine that an exit condition has occurred when a user has pressed a button indicating that the user would like the lighting operation to cease. Alternatively, the system may determine that an exit condition has occurred upon expiration of a timer that was set by the user (e.g., through user interface 514, FIG. 5).

If an exit condition has not occurred, then the lighting operation may continue by iteratively performing process 710. When an exit condition has occurred, then in block 728, the system controller causes the supply of the RF signal by the RF signal source to be discontinued. For example, the system controller may disable the RF signal generator (e.g., RF signal generator 520, FIG. 5) and/or may cause the power supply and bias circuitry (e.g., circuitry 526, FIG. 5) to discontinue provision of the supply current. The method may then end.

As mentioned above, the various embodiments of electrodeless lamp systems may be incorporated into a variety of different types of systems that perform various functions. For example, embodiments of electrodeless lamp systems discussed herein may be configured to output ultraviolet light, which is known to disinfect air, water, and other mediums (e.g., by killing pathogens and bacteria in these mediums). Thus, the electrodeless lamp embodiments discussed herein may be incorporated into air purification systems, such as stand-alone air purification or filtration units or air purification units that are incorporated into other appliances or devices (e.g., refrigerators, freezers, vacuum cleaners, air conditioning units, and so on).

Figure 8:
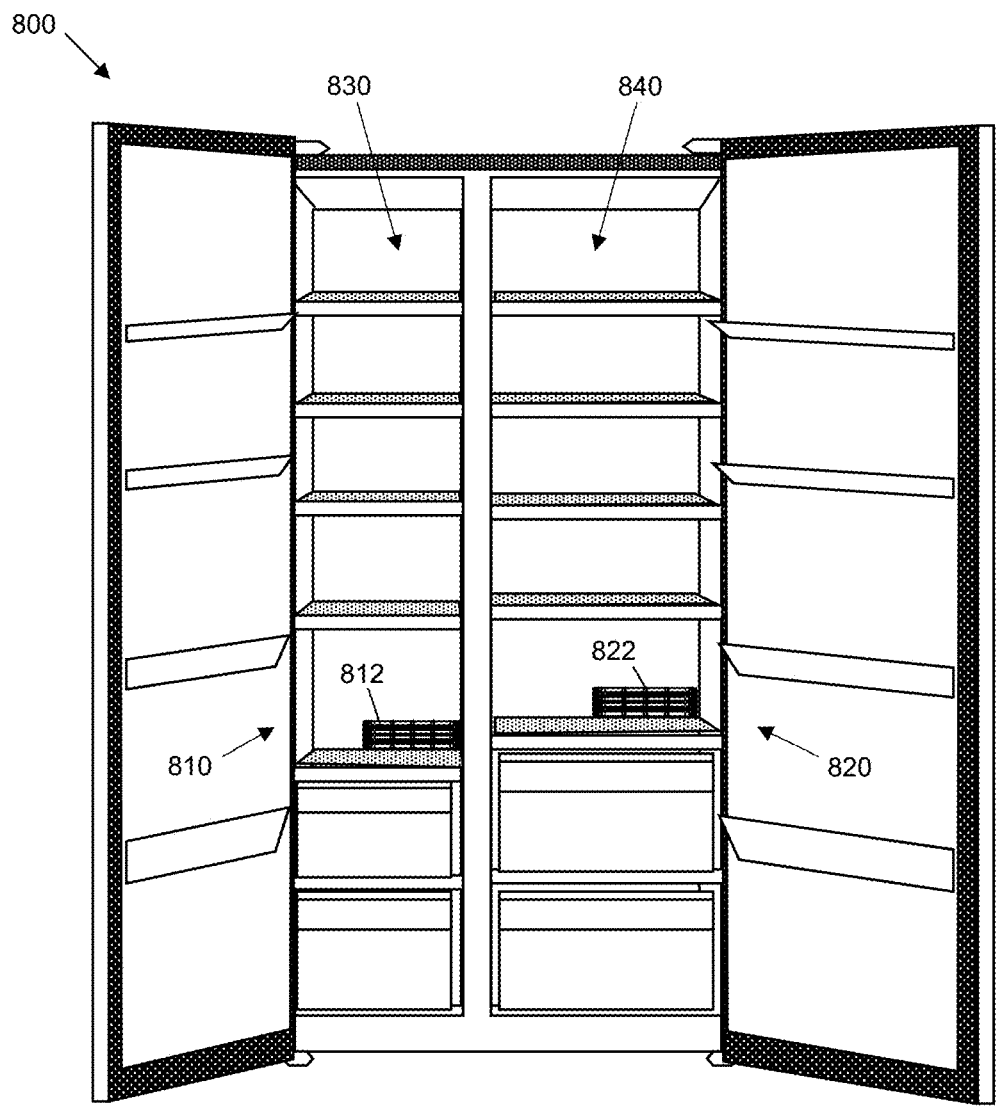
FIG. 8 is a perspective view of a refrigerator system in which an electrodeless lamp system may be integrated, in accordance with an example embodiment.

FIG. 8 is a perspective view of a cooling system 800, in the form of a side-by-side refrigerator/freezer appliance, in which an electrodeless lamp system 810, 820 may be integrated, in accordance with an example embodiment. More specifically, electrodeless lamp system 810 is shown to be incorporated within a freezer compartment 830 of the system 800, and electrodeless lamp system 820 is shown to be incorporated within a refrigerator compartment 840 of the system 800.

Each of systems 810, 820 includes a lamp containment and excitation structure 812, 822 (e.g., structure 130, 530, FIGS. 1, 5), one or more RF signal sources (e.g., RF signal source 520, FIG. 5), a variable resonant circuit (e.g., networks 390, 590, FIGS. 3, 5), and a system controller (e.g., system controller 512, FIG. 5). Many of the components and functionalities of the systems 810, 820 may be substantially the same as the components and functionalities of previously-described lamp systems 100, 500 (FIGS. 1, 5), in various embodiments, and those details are not repeated here for brevity, but are intended to apply to the description of electrodeless lamp systems 810, 820.

The RF signal source, variable resonant circuit, and system controller of each system 810, 820 may be located behind the interior walls of compartments 830, 840, and thus those components are not visible in FIG. 8. According to an embodiment, the lamp excitation structure 812, 822 of each lamp system 810, 820 is positioned so that the structure 812, 822 is in fluid communication with the freezer or refrigerator compartment 830, 840, respectively. Although the lamp excitation structures 812, 822 are shown to be out in the open within the compartments 830, 840, in alternate embodiments, they may be contained within hidden sub-compartments that include openings into the main compartments 830, 840. Each system 810, 820 may include a fan (not illustrated) to increase air flow into and out of the sub-compartment within which each lamp excitation structure 812, 822 is contained, and thus to increase air flow across the electrodeless bulb(s) of each lamp excitation structure 812, 822.

When activated, the lamp systems 810, 820 produce ultraviolet light, which may sanitize the air in the freezer and refrigerator compartments 830, 840. In some embodiments, the lamp systems 810, 820 may be activated automatically on a periodic basis (e.g., for 10 minutes each hour, or for some other duration/period), in which case each system 810, 820 includes a clock/timer coupled to the system controller to provide timing signals that the system controller utilizes to determine when activation/deactivation should occur. In other embodiments, the lamp systems 810, 820 may be activated based on a sensed condition, such as a determination that the door to the compartment 830, 840 has been opened and/or closed, or a determination that a level of air contamination has exceeded a threshold. In such embodiments, the systems 810, 820 would include additional sensors (e.g., door open sensor, air contamination sensor, and so on) to detect the sensed condition, and to communicate information regarding the detected condition to the system controller. In still other embodiments, the lamp systems 810, 820 may be activated and deactivated manually through a user interface (e.g., user interface 514, FIG. 5).

In addition to utilizing the above-described embodiments of electrodeless lamp systems in air purification applications, embodiments of electrodeless lamp systems discussed herein may be incorporated into liquid purification systems, such as stand-alone water purification units, waste water treatment systems, pool filtration and pumping systems, water heaters, reverse osmosis systems, and appliances that dispense, filter or otherwise utilize water (e.g., refrigerator units, and so on).

Figure 9:
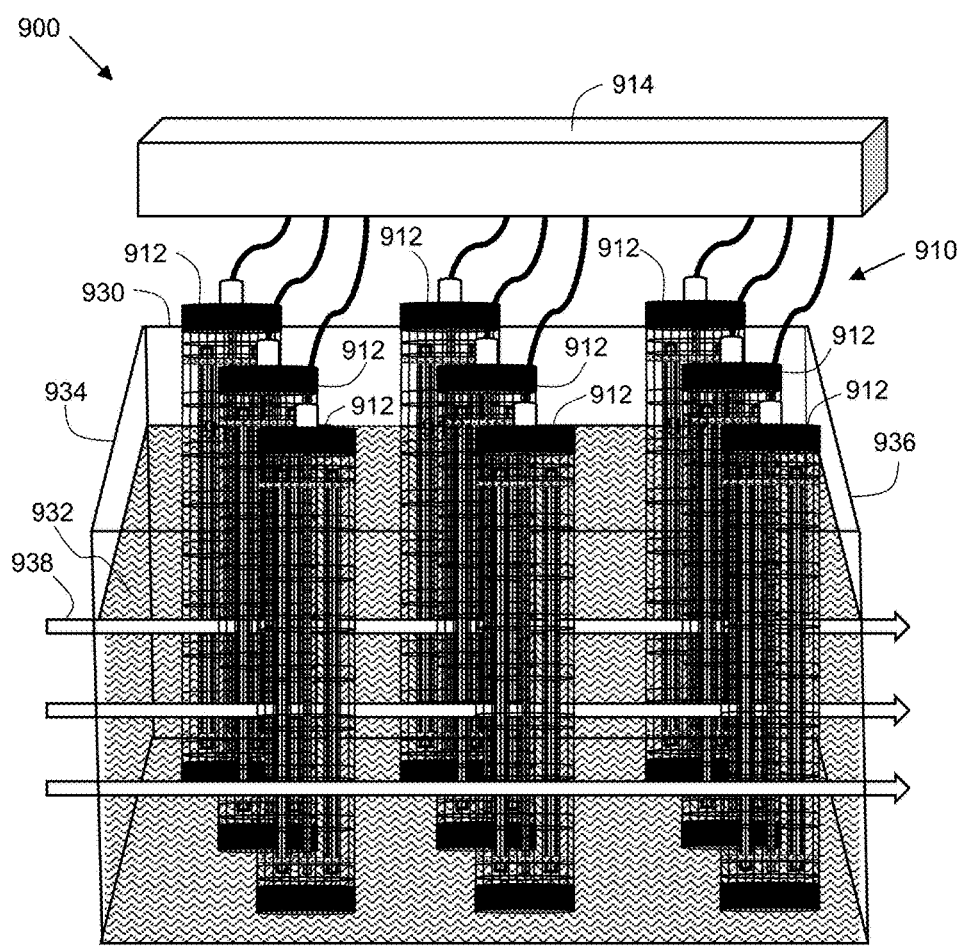
FIG. 9 is a perspective view of a liquid purification system in which an electrodeless lamp system may be integrated, in accordance with another example embodiment.

FIG. 9 is a perspective view of a liquid purification system 900 within which one or more electrodeless lamp systems 910 may be integrated, in accordance with another example embodiment. The liquid purification system 900 includes a liquid channel 930, one or more lamp containment and excitation structures 912 (e.g., structure 130, 530, FIGS. 1, 5), one or more RF signal sources (e.g., RF signal source 520, FIG. 5), one or more variable resonant circuits (e.g., networks 390, 590, FIGS. 3, 5), and a system controller (e.g., system controller 512, FIG. 5). Many of the components and functionalities of the system 910 may be substantially the same as the components and functionalities of previously-described lamp systems 100, 500 (FIGS. 1, 5), in various embodiments, and those details are not repeated here for brevity, but are intended to apply to the description of electrodeless lamp system 910.

The liquid channel 930 is physically configured to contain a liquid 932 (e.g., water, sewage, or other liquids), and to enable the liquid to flow into and out of the channel 930. According to various embodiments, the channel 930 has interior dimensions that enable one or a plurality of lamp excitation structures 912 to be partially or fully immersed within the liquid 932 as it flows through the channel 930. According to an embodiment, the electrodes (e.g., electrodes 140, 150, FIG. 1) of each lamp excitation structure 912 are coated with or contained within a dielectric material or structure so that the electrodes do not electrically short together through the liquid 932 during operation. Alternatively, each entire lamp excitation structure 912 may be contained within a sleeve (not illustrated) that protects the structure 912 from direct contact with the liquid 932.

The RF signal source(s), variable resonant circuit(s), and system controller of system 910 are positioned so that they are electrically isolated from the liquid 932. For example, some or all of these system components may be located in a housing 914 that is positioned outside of the channel 930, or is otherwise sealed.

According to an embodiment, the lamp excitation structure(s) 912 are positioned so that the structure(s) 912 are in fluid communication with the liquid 932 as it flows through the channel 930. As illustrated in FIG. 9, the channel 930 may have an open input end 934 and an open output end 936, and the liquid 932 may flow into the input end 934, through the channel 930 and around/through the lamp excitation structure(s) 912, and out the output end 936 (e.g., as indicated by arrows 938). Alternatively, the system 900 may include inflow and outflow ports (not shown), where the liquid 932 may enter the channel 930 through the inflow port, and may exit the channel 930 through the outflow port. In some embodiments, the system 900 may further include one or more valves (not shown), and/or a pumping system (not shown) to force the liquid 932 through the channel 930. In still other embodiments, the channel 930 may be replaced with a still bath (e.g., a tank).

When activated, the lamp system 910 produces ultraviolet light, which may sanitize the liquid 932 within channel 930 as the liquid 932 flows through the channel 930 and passes over and/or near the lamp excitation structure(s) 912. The lamp system 910 may operate continuously or intermittently. In some embodiments, the lamp system 910 may be activated automatically on a periodic basis (e.g., for 10 minutes each hour, or for some other duration/period), in which case system 910 includes a clock/timer coupled to the system controller to provide timing signals that the system controller utilizes to determine when activation/deactivation should occur. In other embodiments, the lamp system 910 may be activated based on a sensed condition, such as a determination that a valve that allows liquid to enter the channel 930 is open, a determination that a pumping system is activated, a determination that a liquid flow rate is above a threshold, or a determination that a level of liquid contamination has exceeded a threshold. In such embodiments, the system 910 would include additional sensors (e.g., valve or pump activation state sensors, liquid flow rate sensor, liquid contamination sensor, and so on) to detect the sensed condition, and to communicate information regarding the detected condition to the system controller. In still other embodiments, the lamp system 910 may be activated and deactivated manually through a user interface (e.g., user interface 514, FIG. 5).

Figure 10:
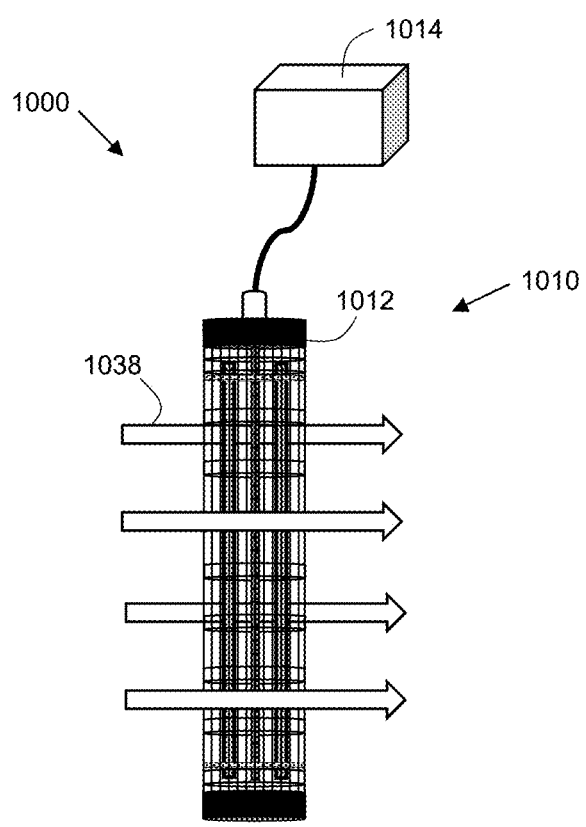
FIG. 10 is a perspective view of an air purification system in which an electrodeless lamp system may be integrated, in accordance with another example embodiment.

FIG. 10 is a perspective view of an air purification system 1000 within which one or more electrodeless lamp systems 1010 may be integrated, in accordance with yet another example embodiment. The air purification system 1000 includes one or more lamp containment and excitation structures 1012 (e.g., structure 130, 530, FIGS. 1, 5), one or more RF signal sources (e.g., RF signal source 520, FIG. 5), one or more variable resonant circuits (e.g., networks 390, 590, FIGS. 3, 5), and a system controller (e.g., system controller 512, FIG. 5). Many of the components and functionalities of the system 1010 may be substantially the same as the components and functionalities of previously-described lamp systems 100, 500, 910 (FIGS. 1, 5, 9), in various embodiments, and those details are not repeated here for brevity, but are intended to apply to the description of electrodeless lamp system 1010.

Some or all of the RF signal source(s), variable resonant circuit(s), and system controller of system 1010 may be located in a housing 1014. According to an embodiment, the lamp excitation structure(s) 1012 are positioned so that the structure(s) 1012 are in fluid communication with air (indicated with arrows 1038) as it flows through the lamp excitation structure(s) 1012. In some embodiments, the system 1000 may further include one or more fans to force the air through the lamp excitation structure(s) 1012.

When activated, the lamp system 1010 produces ultraviolet light, which may purify the air as the air passes over and/or near the lamp excitation structure(s) 1012. The lamp system 1010 may operate continuously or intermittently. In some embodiments, the lamp system 1010 may be activated automatically on a periodic basis (e.g., for 10 minutes each hour, or for some other duration/period), in which case system 1010 includes a clock/timer coupled to the system controller to provide timing signals that the system controller utilizes to determine when activation/deactivation should occur. In other embodiments, the lamp system 1010 may be activated based on a sensed condition, such as a determination that a fan that forces the air past the lamp excitation structure(s) 1012, a determination that an air flow rate is above a threshold, or a determination that a level of air contamination has exceeded a threshold. In such embodiments, the system 1010 would include additional sensors (e.g., fan activation state sensors, air flow rate sensor, air contamination sensor, and so on) to detect the sensed condition, and to communicate information regarding the detected condition to the system controller. In still other embodiments, the lamp system 1010 may be activated and deactivated manually through a user interface (e.g., user interface 514, FIG. 5).

Those of skill in the art would understand, based on the description herein, that embodiments of electrodeless lamp systems may be incorporated into systems or appliances having other configurations, as well. For example, still other embodiments may be configured to output light in the visible spectrum, and such embodiments may be utilized for general ambient lighting purposes in an ambient lighting system.

For the sake of brevity, conventional techniques related to resonators, amplifiers, biasing, impedance matching, and other functional aspects of the systems (and the individual operating components of the systems) may not be described in detail herein. The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

An embodiment of a system includes an RF signal source, a first electrode, a second electrode, and a cavity configured to receive an electrodeless bulb. The RF signal source is configured to generate an RF signal. The first electrode is configured to receive the RF signal and to convert the RF signal into electromagnetic energy that is radiated by the first electrode. The cavity is defined by first and second boundaries that are separated by a distance that is less than the wavelength of the RF signal so that the cavity is sub-resonant. The first electrode is physically positioned at the first boundary, and the second electrode is physically positioned at the second boundary. The first electrode, the second electrode, and the cavity form a structure that is configured to capacitively couple the electromagnetic energy into the electrodeless bulb when the electrodeless bulb is positioned within the cavity.

An embodiment of a method of operating an electrodeless lamp system includes producing, by an RF signal source, an RF signal, and conveying the RF signal to a first electrode of a lamp excitation structure. The lamp excitation structure includes the first electrode, a second electrode, and a cavity configured to receive an electrodeless bulb. The cavity is defined by first and second boundaries that are separated by a distance that is less than a wavelength of the RF signal so that the cavity is sub-resonant. The first electrode is physically positioned at the first boundary, and the second electrode is physically positioned at the second boundary. The first electrode, the second electrode, and the cavity form a structure that is configured to capacitively couple the electromagnetic energy into the electrodeless bulb when the electrodeless bulb is positioned within the cavity. The method further includes converting, by the first electrode, the RF signal into electromagnetic energy that is radiated by the first electrode into the cavity.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system comprising:
   a radio frequency (RF) signal source configured to generate an RF signal;
   a first electrode electrically coupled to the RF signal source, wherein the first electrode is configured to receive the RF signal and to convert the RF signal into electromagnetic energy that is radiated by the first electrode;
   a second electrode; and
   a cavity configured to receive an electrodeless bulb that has an outer diameter, wherein the cavity is defined by first and second boundaries that are separated by a distance that is greater than the outer diameter of the electrodeless bulb and that is less than the wavelength of the RF signal so that the cavity is sub-resonant, wherein the first electrode is physically positioned at the first boundary, wherein the second electrode is physically positioned at the second boundary, and wherein the first electrode, the second electrode, and the cavity form a structure that is configured to capacitively couple the electromagnetic energy into and entirely across the outer diameter of the electrodeless bulb, when the electrodeless bulb is positioned within the cavity between the first and second electrodes.

2. The system of claim 1, wherein the distance is less than half the wavelength of the RF signal.

3. The system of claim 2, wherein the distance is less than one 50th the wavelength of the RF signal.

4. The system of claim 3, wherein the distance is less than one 100th the wavelength of the RF signal.

5. The system of claim 1, wherein the distance is in a range between 10 centimeters and 3.0 meters.

6. The system of claim 1, wherein:
   the first electrode has a rod shape with a conductive outer surface; and
   the second electrode has a tubular shape with a conductive inner surface, and wherein the distance is defined by a distance between the outer surface of the first electrode and the inner surface of the second electrode.

7. The system of claim 1, wherein the first electrode is configured as a first planar conductive structure, and the second electrode is configured as a second planar conductive structure.

8. The system of claim 1, wherein the second electrode includes a plurality of holes to enable light or radiation to exit the cavity.

9. The system of claim 1, wherein the RF signal has a frequency in a range from 10 megahertz (MHz) to 3.0 gigahertz (GHz).

10. The system of claim 1, wherein the RF signal source is configured to generate the RF signal to produce a voltage across the first and second electrodes in a range of 90 volts to 3000 volts.

11. The system of claim 1, wherein the cavity is configured to receive multiple electrodeless bulbs.

12. The system of claim 1, wherein the system is selected from an ambient lighting system, an air purification system, and a liquid purification system.

13. The system of claim 1, further comprising:
a variable resonant circuit electrically coupled between an output of the RF signal source and the first electrode; and
a system controller configured to establish and modify a resonant frequency of the variable resonant circuit through control signals that the system controller sends to the variable resonant circuit.

14. The system of claim 13, further comprising:
an electric field sensor configured to sense an electromagnetic field intensity within or proximate to the cavity, and to send a sensor signal to the system controller indicating the electromagnetic field intensity,
wherein the system controller is configured to modify the resonant frequency of the variable resonant circuit based on the electromagnetic field intensity indicated in the sensor signal.

15. The system of claim 13, further comprising:
a radiation intensity sensor configured to sense a radiation intensity within or proximate to the cavity, and to send a sensor signal to the system controller indicating the radiation intensity,
wherein the system controller is configured to modify the resonant frequency of the variable resonant circuit based on the radiation intensity indicated in the sensor signal.

16. The system of claim 13, further comprising:
a luminous intensity sensor configured to sense a luminous intensity within or proximate to the cavity, and to send a sensor signal to the system controller indicating the luminous intensity,
wherein the system controller is configured to modify the resonant frequency of the variable resonant circuit based on the luminous intensity indicated in the sensor signal.

17. The system of claim 13, wherein the variable resonant circuit includes one or more variable passive devices selected from inductors, capacitors, and resistors.

18. A method of operating an electrodeless lamp system, the method comprising:
producing, by an RF signal source, an RF signal;
conveying the RF signal to a first electrode of a lamp excitation structure that includes the first electrode, a second electrode, and a cavity configured to receive an electrodeless bulb that has an outer diameter, wherein the cavity is defined by first and second boundaries that are separated by a distance that is greater than the diameter of the electrodeless bulb and that is less than a wavelength of the RF signal so that the cavity is sub-resonant, wherein the first electrode is physically positioned at the first boundary, wherein the second electrode is physically positioned at the second boundary, and wherein the first electrode, the second electrode, and the cavity form a structure that is configured to capacitively couple the electromagnetic energy into the electrodeless bulb when the electrodeless bulb is positioned within the cavity between the first and second electrodes; and
converting, by the first electrode, the RF signal into electromagnetic energy that is radiated by the first electrode into the cavity.

19. The method of claim 18, further comprising:
sensing one or more of an electromagnetic field intensity, a luminous intensity, and a radiation intensity within or in proximity to the cavity;
producing a sensor signal that indicates the electromagnetic field intensity, the luminous intensity, or the radiation intensity; and
modifying a resonant frequency of a variable resonant circuit that is electrically coupled between the RF signal source and the first electrode based on the sensor signal.

20. The method of claim 19, wherein modifying the resonant frequency is performed to increase the electromagnetic field intensity, the luminous intensity, or the radiation intensity.

* * * * *